United States Patent [19]
Merkl

[11] 3,856,841
[45] Dec. 24, 1974

[54] ALUMINUM ORGANOIODIDES

[76] Inventor: George G. Merkl, 46 Sunset Ct., Haworth, N.J. 07641

[22] Filed: Mar. 28, 1973

[21] Appl. No.: 345,659

[52] U.S. Cl......... 260/448 A, 260/414, 260/448 R, 260/448 AD
[51] Int. Cl. ............................................. C07f 5/06
[58] Field of Search..... 260/448 AD, 448 R, 448 A, 260/414

[56] References Cited
UNITED STATES PATENTS

| | | | |
|---|---|---|---|
| 1,068,777 | 7/1913 | Jonas et al. | 260/448 R |
| 1,079,916 | 11/1913 | Jonas et al. | 260/448 R |
| 1,793,935 | 2/1931 | Kaufler et al. | 260/448 AD |
| 1,870,859 | 8/1932 | Maximoff | 260/448 R |
| 2,125,961 | 8/1938 | Shoemaker | 260/448 AD |
| 2,141,477 | 12/1938 | Losch | 260/448 R |
| 2,292,205 | 8/1942 | Denison et al. | 260/448 AD |
| 2,412,469 | 12/1946 | Nicholl | 260/448 AD |
| 3,399,221 | 8/1968 | Bertoni et al. | 260/448 A |
| 3,446,828 | 5/1969 | Buzas et al. | 260/448 AD |

*Primary Examiner*—H. Sneed
*Attorney, Agent, or Firm*—David Fink

[57] ABSTRACT

An aluminum iodide is prepared by first forming a reactive aluminum and then contacting the reactive aluminum with iodine and a liquid organic compound. The reactive aluminum is formed by permeating in the presence of hydrogen ions highly pure aluminum with a metal having an atomic volume close to that of hydrogen. Aluminum organoiodides are useful for detergents, catalysts, surgical scrubs, and other diverse applications.

10 Claims, 1 Drawing Figure

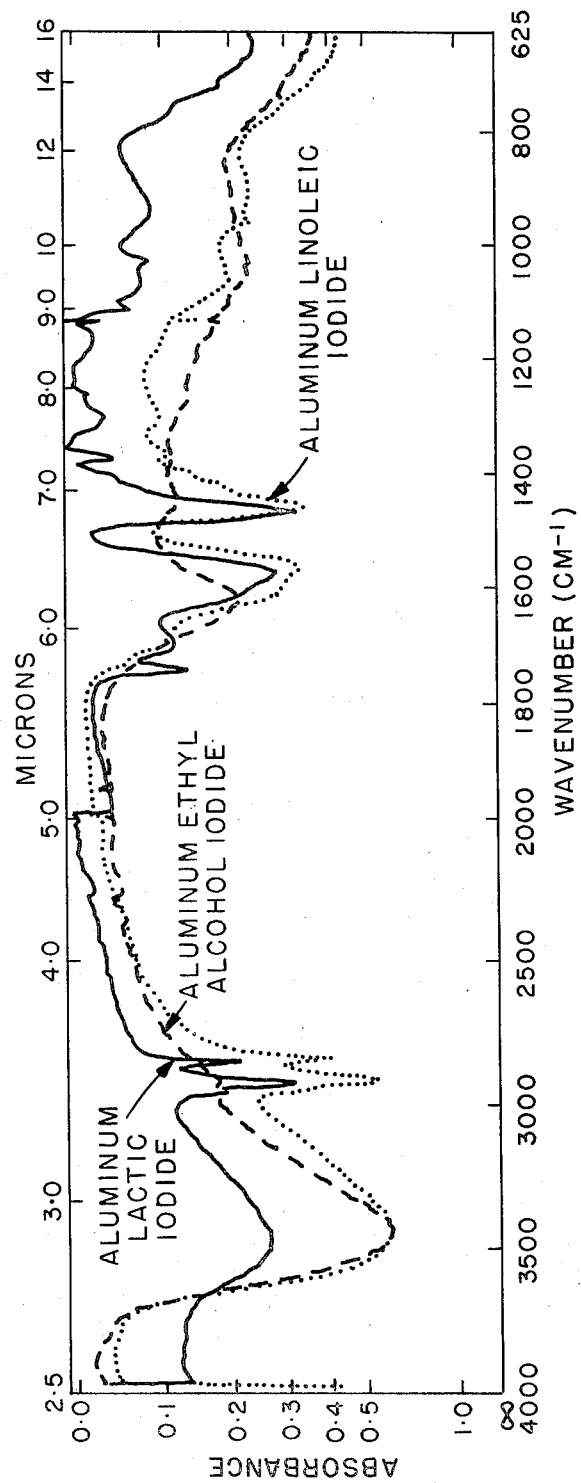

ALUMINUM ORGANOIODIDES

CROSS-REFERENCE TO RELATED APPLICATIONS

Reference is had to the following co-pending patent applications:
  Catalytic Electrode Ser. No. 211,979, filed Dec. 27, 1971;
  Aluminum Salts Of Carboxylic Acids Ser. No. 255,757, filed May 22, 1972;
  Polymeric Salts Of Carboxylic Acids Ser. No. 255,758, filed May 22, 1972.

BACKGROUND OF THE INVENTION

The present invention relates to the formation of an aluminum organoiodide.

Generally, most commercial aluminum organoiodides appear to be focused about alkylaluminum iodides.

The most widely used types of aluminum organoiodides appear to be the alkylaluminum iodides. Basically, these compounds are an aluminum iodide with one or more of the iodide atoms replaced by alkyl groups. The standard method of production is by the reaction of metallic aluminum with an alkyliodide. Numerous modifications of operating conditions and catalysts to promote the reaction are known. For example, a mixture of aluminum chloride and alkylaluminum iodide can be added initially to start the reaction. An alternate catalyst is the use of about 2.5percent by weight of bromine or iodine and a small amount of a primary alkylchloride.

Alkylaluminum iodides are used as polymerization catalysts, especially in the presence of a small amount of a pure trialkyl aluminum. The range of polymerization applications is quite extensive.

Another application is for hydrogenating an unsaturated organic compound with a minimum of hydrocracking by heating to 250° to 400° centigrade with hydrogen and an alkylaluminum iodide catalyst, having a ratio of aluminum to iodide between 1 to 2.25 and 1 to 1.5. Other applications include use in a Friedel-Crafts reaction to increase the yield of polysubstituted products and for the preparation of alkylsilanes and iodosilanes by the reaction of silica with an alkylaluminum iodide.

The products produced by the present methods to beyond the known products and have, in addition to the aforementioned application, application in detergents, for a cosmetic base, for inclusion in a soap as a germicide, and for use as a surgical scrub. Both gram positive and gram negative germs are killed by the present product.

SUMMARY OF THE INVENTION

One of the principle objects of the invention is to provide a method of preparing aluminum organoiodides.

Another object of the present invention is to provide novel aluminum organoiodides.

A further object of the present invention is to provide a novel surgical scrub means.

Yet another object of the present invention is to provide a novel soap comprising aluminum organoiodide.

Further objects and advantages of the invention will be set forth in part in the following specification and in part will be obvious therefrom, without being specifically referred to, the same being realized and attained as pointed out in the claims hereof.

Other objects of the invention, in part, will be obvious and will, in part, appear hereinafter.

The invention accordingly comprises the several steps and the relation of one or more of such steps with respect to each of the others, all as exemplified in the following detailed disclosure, and the scope of the application of which will be indicated in the claims.

In addition, the invention includes novel products described herein.

BRIEF DESCRIPTION OF THE DRAWING

For a fuller understanding of the nature and objects of the invention, reference should be had to the following detailed description, taken in connection with the accompanying drawing, in which infrared spectracurves are given for aluminum linoleic iodide, aluminum lactic iodide, and aluminum ethyl alcohol iodide.

THE INVENTION

The present invention is focused on the utilization of the remarkable properties of a reactive aluminum prepared by the methods given in the aforementioned co-pending patent application, Catalytic Electrode.

The reactive aluminum in the present disclosure corresponds to the aluminum catalytic electrode described in the aforementioned co-pending patent application.

Generally, a reactive aluminum is prepared by contacting highly pure aluminumin the presence of a hydrogen ion source with a metal which can form a hydride. The hydrogen ion source can be an inorganic acid, such as hydrochloric acid or or hydrobromic acid or the like, or an organic acid, such as citric acid or acetic acid, or the like. The reactive aluminum in an alkali solution such as water and sodium hydroxide will serve as an hydrogen ion source for the formation of another reactive aluminum.

The metal used for forming the reactive aluminum can be an element or an alloy. Preferably, the metal is gallium or indium, or an alloy of the two, or mercury. A desirable characteristic of the metal is that it is soft and pliable and preferably a liquid during the process in order to permit the rapid permeation or diffusion of the aluminum. The general rule is that a metal with an atomic volume near that of hydrogen is preferred.

It should be understood that the term "highly pure" herein means greater than 99.9 percent by weight and that purities in the order 99.99 percent by weight or higher, are preferable.

One simple method of preparing a reactive aluminum is to use an aluminum piece, such as a rod, 99.9 percent pure by weight, having a length of about three inches and a diameter of about a half inch. The aluminum rod is placed on its side in a glass dish and sufficient 2N acid such as hydrochloric acid is added to cover the aluminum rod. The aluminum rod is contacted with the metal, such as mercury or gallium, and the metal is given time to permeate the aluminum rod. Of course, the aluminum rod can be treated in a vertical position, if desired, and no special rod shape is necessary. Other shapes may be used.

The concentration of the acid can cover the broadest range to include almost neutral water. The choice of the hydrogen ion source, such as an acid, will depend upon the economics and the purity of the final product to be formed. For example, the use of hydroiodic acid as a hydrogen ion source for preparing the reactive aluminum avoids the introduction of impurities in the final product desired in contrast to the use of hydrochloric acid, which might result in the presence of perhaps a trace of chlorine in the final products produced. Even if hydrochloric acid were used to prepare the reactive aluminum, a thorough washing of the reactive aluminum rod in water will minimize the presence of chlorine in the product to be produced.

It is preferable to prepare the aluminum rod for the reaction by at least partially stripping the aluminum oxide coating which invariably forms on the surface of aluminum, due to exposure to air and moisture. If the aluminum rod has been stripped, then hot water can serve as a hydrogen ion source, although the reaction time is quite long. Otherwise, it may be desirable to start out with a strong acid to strip off the oxide coating on the aluminum rod in order to initiate the permeation as quickly as possible. The aluminum rod may be stripped mechanically with sand paper or a file or the like.

The reaction to form the reactive aluminum proceeds as follows. At first, large bubbles are formed on the rod, and these bubbles rise to the surface of the acid. After a while, instead of large bubbles forming, tiny bubbles will appear to be emanating from many parts of the upper surface of the aluminum rod. The occurrence of the multitude of tiny bubbles indicates that the aluminum rod is being converted into a reactive aluminum as herein used.

Generally, the aluminum rod will take up or absorb from 0.1 to 5 percent by weight of the metal, say mercury, depending upon the length of time the permeation is permitted to continue. A range of 2 to 3 percent by weight of the mercury is preferable.

The permeation can be stopped on the basis of the increased weight of the aluminum rod due to the permeation of the metal or due to the production of a multitude of tiny bubbles for a period of 10 to 15 minutes, or due to the simple test of placing the aluminum rod in water and observing whether hydrolysis of the water takes place.

An aluminum rod, treated as described, displays surprisingly active properties not at all suggested by the prior art. The prior art has recognized that aluminum and an amalgam of aluminum exhibits active properties, but it is of considerable significance that the treatment of highly pure aluminum as described herein exhibits chemical properties that far exceed prior art contemplation.

Another method of preparing a reactive aluminum uses gallium instead of mercury. An aluminum rod, as described above, is placed in a glass dish and covered with hydrochloric acid and one end of the aluminum rod is contacted with the gallium, having a mass from 1 to 3 percent of the aluminum rod. The treatment takes from 10 to 15 minutes, depending upon how well the oxide coating on the aluminum rod has been removed at the point of contact of the gallium and the aluminum rod. A fairly clean part of the aluminum is indicated by the observance of large bubbles generated thereat.

It is desirable to dip a reactive aluminum formed with gallium into anhydrous alcohol immediately upon the completion of the process in order to prevent the formation of a brownish compound on the aluminum rod thereafter.

The amount of the metal in the aluminum rod can be varied in accordance with applications. In genereal, if a higher percent of the metal by weight is desired, quick cooling of the reactive aluminum rod after formation will prevent the squeezing out of the metal due to an exothermic reaction. Water is convenient for this purpose. In cases where it is desirable to reduce the amount of the metal in the aluminum rod, the reactive aluminum can be heated to squeeze out the metal. For many applications, a mercury content of about 0.1 percent by weight is desirable.

From the above, it is clear herein, including the claims, what is meant by a "reactive aluminum."

The reactive aluminum can replace the well known Ziegler Catalyst in many reactions to produce the same or comparable results without the dangers associated with the Ziegler Catalyst and with great economical advantage.

The reactive aluminum exhibits an aligned matrix and, it is believed capable of converting, at least partially, to an hydride at one or more valences and produces $Al^{+++}$, $e^-$, $H^+$, $OH^-$, $HO_2^{--}$, and $O^{--}$, radicals depending upon the fluid contacting the reactive aluminum.

Certain impurities, such as copper and iron, inhibit the formation of a reactive aluminum and so should be avoided in the aluminum rod. Impurities which inhibit or promote the reaction are given in the aforementioned catalytic electrode application.

Generally, an aluminum alcohol iodide can be formed by combining an alcohol and iodine in the presence of a reactive aluminum. The choice of the alcohol can include a simple aliphatic alcohol, such as ethyl alcohol or an unsaturated aliphatic, such as ethenol or a substituted aliphatic alcohol, such as ethanolamine or an aromatic alcohol such as benzyl or an alicyclic, such as cyclohexanol, or an heterocyclic alcohol such as furfuryl alcohol. A carboxylic salt may be added to the alcohol and iodine to form a complex product, which includes the characteristic carboxylic organic radical.

Generally, in forming an aluminum alcohol iodide, the amount of iodine which becomes chemically bonded into the aluminum alcohol iodide will depend upon the mole ratio of the alcohol to iodine and the time that the reactive aluminum is permitted to react with the alcohol and iodine. As the reaction dynamics are not understood and believed to be extremely complex, the stoichiometry cannot be given with any precision. There are, however, empirical guidelines which have been determined.

If, for example, equal moles of iodine and ethyl alcohol are combined, the solution takes on a characteristic brown color. The introduction of a reactive aluminum results in a strongly exothermic reaction, which eventually results in a change in the color of the solution to a greenish yellowish color. If an excess amount of iodine is used, the solution will retain a brown or dark brown color and at the completion of the reaction, a mixture of aluminum alcohol iodide with alcohol and dissolved iodine will result. If, on the other hand, the amount of iodine is equal to or just less than the quantity sufficient to fully react with the alcohol, completion of the reaction to form the aluminum alcohol iodide may be determined by analytically testing the solution for the presence of free iodine. Another method of monitoring the reaction to determine at least the approximate completion of the reaction is by measuring the mass of reactive aluminum used. When the mass of reactive aluminum has stabilized, it is an indication that the reactive aluminum is not continuing to form the aluminum alcohol iodide at an appreciable rate so that the reaction may be considered to be completed.

The amount of iodine which can be chemically combined with an alcohol will depend upon the chemical structure of the alcohol used. In addition, the addition of an organic compound, say a carboxylic acid, to the alcohol will further complicate the reaction dynamics.

Generally, if the alcohol used is miscible with water, then the aluminum alcohol iodide formed, will be both water and alcohol soluble and probably soluble in most hydrocarbon solvents.

As the reaction with the alcohol and iodine is highly exothermic, it is highly desirable to use a reflux system in order to avoid the excessive loss of alcohol due to evaporation.

A typical reaction permitted to go to full completion results in a polymer-like substance having a greenish brown color. This product can be dried at 300° Fahrenheit and then pulverized to a powder. Known unsaturated organic iodides melt at less than 300° Fahrenheit and, in particular, iodoform explodes at less than 300° Fahrenheit.

In the case where the preferred quantity of iodine to alcohol is not readily known, it is convenient to use an amount of iodine less than what is believed to be the optimum, so that the formation of the desired product is assured without free iodine. This product will merely be in an alcohol solution and the alcohol can be distilled off to leave the desired product.

Some caution should be taken in carrying out the reaction to avoid excessive heat due to the chemical activity. For this purpose, the reaction vessel can be cooled. It is more convenient to add the iodine to the alcohol with the reactive aluminum in the alcohol over an extended period of time to prevent excessive heat buildup.

The reactive aluminum should be completely covered by the alcohol during the reaction in order to avoid the formation of additional products due to the reaction of the reactive aluminum and air.

The activity of the reactive aluminum used will depend, in part, on the metal which has been permeated into the aluminum and the percent by weight of the metal. It is desirable to use a reactive aluminum which shows relatively low activity in order to reduce the degree of the exothermic reaction. An example of a somewhat less active reactive aluminum is highly pure aluminum which has been permeated in the presence of hydrogen ions with mercury to about 3 percent by weight.

It is desirable to obtain the aluminum alcohol iodide product with a maximum purity and at worst, a trace of impurities. such as mercury. Surprisingly, very little mercury appears in a product prepared with a mercury permeated reactive aluminum. This is because the mercury is not soluble in the solution and does not chemically combine with the compounds due to $H^+$.

It is known that as a reactive aluminum is reacting to form a product aluminum metal is taken up into the new product formed so that percent by weight of mercury in the reactive aluminum increases gradually. A mercury permeated reactive aluminum which is permitted to react until all other aluminum has been consumed, will leave mercury at the bottom of the vessel. Therefore, the first rule for avoiding mercury contamination is to avoid consuming a mercury permeated reactive aluminum completely. The better rule is to use a relatively large quantity of reactive aluminum with respect to the alcohol so that the mass change in the total reactive aluminum is small with a correspondingly small change in percent by weight of mercury in the reactive aluminum. Experience indicates that a reactive aluminum tends to retain the permeated metal readily to at least percent by weight in the order of 3 percent.

Although the formation of the aluminum alcohol iodide is empirical, a great advantage is obtained by the fact that if the iodine to alcohol ratio is too high as evidenced by a persistent dark brown color or verification of free iodine present or the presence of iodine crystals at the bottom of the vessel, one can simply add additional alcohol to further react the iodine to form the aluminum alcohol iodide.

Of course, additional compounds may be added to the alcohol and iodine to form novel products. For example, carboxylic acids may be added to the alcohol so that the product of the reaction is a complex containing aluminum, alcohol, iodine, and the characteristic group of the carboxylic acid. It is convenient to use alcohol soluble carboxylic acid for this purpose. The products formed with fatty acids are soluble in alcohol but not in water. These products lend themselves to use as surgical scrubs, germicides, fungus control, detergents and preservatives.

Omitting the alcohol so that only a carboxylic acid and iodine is used leads to the formation with the reactive aluminum a product which can be called generically an aluminum carboxylic iodide.

It is preferable to use a carboxylic acid which is in a liquid form or which can be made into a liquid form conveniently. These products find application in the aforementioned areas, mentioned in connection with the aluminum alcohol iodide. The products made with fatty acids will be soluble in alcohol but not in water.

The selection of the organic compounds used in the formation of the aluminum organoiodide should be guided by the ultimate application of the product. For example, it is known that myristic acid is used for the formation of base compounds for cosmetics. Then, an aluminum myristic iodide would be highly compatible with a cosmetic which is based on myristic acid. The aluminum myristic iodide would provide fungus control and germicidal protection needed for cosmetic bases.

It may be desirable to control fungus growth and bacteria growth in, say animal foods, by the use of an aluminum alcohol starch iodide. This can be prepared by merely adding starch to the alcohol and iodine and reacting with the reactive aluminum.

Another variation is to use glycerine with iodine and react with the reactive aluminum to form an aluminum glycerine iodide. It is known that glycerine is used in soaps to impart a high quality characteristic attractive to consumers. The use of aluminum glycerine iodide not only serves this function, but adds the feature of effectiveness in bacteria killing power.

In view of the high potency killing power of the aluminum organoiodides, incorporation into a soap or detergent is desirable One general approach for accomplishing this is to first prepare an aluminum alcohol iodide. The aluminum alcohol iodide should be dried and pulverized to a powder. A cold addition of the powder to soap avoids the possible adverse reaction with sodium ions in the soap. Another way is to heat the soap to a liquid state and then add the aluminum alcohol iodide. Care should be taken to avoid a temperature which will break the bonds of the aluminum alcohol iodide. The aluminum organoiodides are highly desirable for use as a surgical scrub due to the germicidal powers.

A further appreciation of the aluminum organoiodides can be seen by reference to the FIGURE which shows infrared spectra of aluminum linoleic iodide, aluminum lactic iodide, and aluminum ethyl alcohol iodide. The samples for each of the curves were prepared in a dry form and then mixed with potassium bromide to form a disc in accordance with the standard techniques. The scan speed of all of the samples was medium.

The analysis of interpretation of infrared spectra is a difficult and expanding art, but some comment can be made with respect to the FIGURE though no limitation is intended.

Broadly, it is known that the absorption in the region of about $3400 cm^{-1}$ can be attributed to the presence of hydroxyl groups. It is of interest that neither the curve for aluminum linoleic iodide or aluminum lactic iodide shows the characteristic absorption bands found for carboxylic acids or carboxylic esters. In the same way, it is of interest that the curve for aluminum ethyl alcohol iodide does not show the characteristic absorption bands for alcohol. Then, the infrared spectra confirms that the product is not a mixture but is in fact a new compound.

EXAMPLES

Illustrative, non-limiting examples of the practice of the invention are set out below. Numerous other examples can readily be evolved in the light of the guilding principles and teachings contained herein. The examples are intended merely to illustrate the invention and not in any sense to limit the manner in which the invention can be practiced. The parts and percentages recited herein and all through this specification, unless specifically provided otherwise, refer to parts to weight and percentages by weight.

In the examples which follow, it is usually preferable to terminate the reaction by the removal of the reactive aluminum after the aluminum organoiodide has formed but before the reactive aluminum can react with the remaining organic compound to chemically change it. For example, it is known that the reactive aluminum will form a salt of a carboxylic acid so that after all of the iodine has been chemically combined with a carboxylic acid a salt of the carboxylic acid will form.

EXAMPLE 1

An aluminum ethyl alcohol is formed by combining one mole of iodine with two moles of ethyl alcohol ($CH_3CH_2OH$) in the presence of a reactive aluminum rod of about 100 grams. As the reaction is highly exothermic, the iodine should be added to the ethyl alcohol a little at a time, say about a ¼ of a mole every 10 minutes. A system for reflux should be provided in order to avoid the loss of ethyl alcohol during the reaction. The reaction takes several hours and can be left for as long as 8 to 10 hours. Removal of the reactive aluminum terminates the reaction. A decided change in the color of the mixture will signal the transition from iodine dissolved in ethyl alcohol to the formation of the desired product. During the reaction, the solution may be cooled to reduce the evaporation of the ethyl alcohol. The product obtained may be dried to a powder by heating to about 150°. Fahrenheit.

EXAMPLE 2

An aluminum ethenol iodide is formed by combining one mole of iodine and two moles of ethenol ($CH_2$: $CHOH$) in the presence of a reactive aluminum rod of about 200 grams. A reflux system may be used as well, as a means to cool the solution. The iodine should be added to the ethenol over an extended period of time in order to reduce the heat generated by the reaction.

EXAMPLE 3

An aluminum ethenolamine iodide is formed by combining 1 mole of iodine and 2 moles of ethenolamine ($NH_2CH_2CH_2OH$) in the presence of a reactive aluminum.

EXAMPLE 4

An aluminum benzyl alcohol iodide is formed by combining 1 mole of iodine with 3 moles of benzyl alcohol ($C_6H_5CH_2OH$) in the presence of a reactive aluminum. The precautions of EXAMPLE 1 are repeated by incorporation.

EXAMPLE 5

An aluminum cyclohexanol iodide is formed by combining 1 mole of iodine and 4 moles of cyclohexanol ($C_6H_{11}OH$) in the presence of a reactive aluminum.

EXAMPLE 6

An aluminum furfuryl alcohol iodide is formed by combining 1 mole of iodine and 3 moles of furfuryl alcohol ($C_4H_3OCH_2OH$) in the presence of a reactive aluminum

EXAMPLE 7

An aluminum ethylene glycol iodide is formed by combining 1 mole of iodine and 5 moles of ethylene glycol($CH_2OH—OH_2OH$) in the presence of a reactive aluminum.

EXAMPLE 8

An aluminum glycerol iodide is formed by combining 1 mole of iodine and 4 moles of glycerol ($CH_2OH—CHOH—CH_2OH$) in the presence of a reactive aluminum.

EXAMPLE 9

An aluminum sorbitol iodide is formed by combining 1 mole of iodine and seven moles of sorbitol ($CH_2OH)(CHOH)_4(CH_2OH$) in the presence of a reactive aluminum.

EXAMPLE 10

An aluminum isopropyl alcohol iodide is formed by combining 1 mole of iodine and 2 moles of isopropyl alcohol ($CH_3CHCH_3OH$) in the presence of a reactive aluminum.

EXAMPLE 11

An aluminum butyl alcohol iodide is formed by combining 1 mole of iodine and 6 moles of butyl alcohol($CH_3CH_2CH_2CH_2OH$) in the presence of a reactive aluminum.

EXAMPLE 12

An aluminum dimethyl ketone iodide is formed by combining 1 mole of iodine and 4 moles of dimethyl ketone (acetone) ($CH_3COCH_3$) in the presence of a reactive aluminum.

EXAMPLE 13

An aluminum ethyl methyl ketone iodide is formed by combining 1 mole of iodine and 5 moles of ethyl methyl ketone ($CH_3CH_2COCH_3$) in the presence of a reactive aluminum.

EXAMPLE 14

An aluminum ethyl iso-propyl ketone iodide is formed by combining 1 mole of iodine and 8 moles of ethyl iso-propyl ketone ($CH_3CH_2COCHCH_3CH_3$) in the presence of a reactive aluminum.

EXAMPLE 15

An aluminum formaldehyde iodide is formed by combining 1 mole of iodine and 3 moles of formaldehyde (HCHO) in the presence of a reactive aluminum.

EXAMPLE 16

An aluminum acetaldehyde iodide is formed by combining 1 mole of iodine and 5 moles of acetyldehyde ($CH_3$—CHO) in the presence of a reactive aluminum.

EXAMPLE 17

An aluminum butyraldehyde iodide is formed by combining 1 mole of iodine and 5 moles of butyraldehyde ($CH_3$—$CH_2$—CHO) in the presence of a reactive aluminum.

EXAMPLE 18

An aluminum phenol iodide is formed by combining 1 mole of iodine and 9 moles of phenol ($C_6H_5OH$) in the presence of a reactive aluminum.

EXAMPLE 19

An aluminum linoleic iodide is formed by combining 1 mole of iodine and 1 mole of linoleic acid ($CH_3$)($CH_2$) 4 CH : $CHCH_2CH$:$CH(CH_2)_7COOH$ in the presence of a reactive aluminum.

EXAMPLE 20

An aluminum lauric iodide is formed by combining 1 mole of iodine and 3 moles of lauric acid ($C_{11}H_{23}COOH$) in the presence of a reactive aluminum.

EXAMPLE 21

An aluminum formic iodide is formed by combining 1 mole of iodine and 4 moles of formic acid (HCOOH) in the presence of a reactive aluminum.

EXAMPLE 22

An aluminum lactic iodide is formed by combining 1 mole of iodine and 5 moles of lactic acid ($CH_3CHOH$-COOH) in the presence of a reactive aluminum.

EXAMPLE 23

An aluminum acrylic iodide is formed by combining 1 mole of iodine and 3 moles of acrylic acid ($CH_2$:CHCOOH) in the presence of a reactive aluminum.

EXAMPLE 24

An aluminum myristic iodide is formed by combining 1 mole of iodine and 3 moles of myristic acid ($C_{13}H_{27}COOH$) in the presence of a reactive aluminum.

EXAMPLE 25

Any of the examples, 1 to 17, can be repeated with the addition of one tenth of a mole of carboxylic acid soluble in the solution in the respective examples.

EXAMPLE 26

An aluminum glycerine iodide is formed by combining 1 mole of iodine and 10 moles of glycerine in the presence of a reactive aluminum.

EXAMPLE 27

An aluminum butane iodide is formed by combining iodine vapor and butane ($C_4H_{10}$) in the presence of a reactive aluminum.

EXAMPLE 28

An aluminum iodide is formed by combining iodine vapor and methane ($CH_4$) in the presence of a reactive aluminum.

I claim:

1. A method of forming an aluminum organoiodide comprising the steps of forming a reactive aluminum by permeating highly pure aluminum in the presence of a hydrogen ion source with another metal having an atomic volume close to that of hydrogen, and subsequently, reacting the reactive aluminum with a combination of iodine and an organic compound selected from the group consisting of alcohol, ketone, aldehyde, phenol, gylcol, and carboxylic acids whereby said aluminum organoiodide is formed.

2. The method as claimed in claim 1, wherein said aluminum has a purity of at least about 99.99 percent by weight and said hydrogen ion source is an aqueous acid or an aqueous alkaline solution.

3. The method as claimed in claim 2, wherein said other metal is selected from the group consisting of mercury, indium, and gallium.

4. The method as claimed in claim 3, wherein a fatty carboxylic acid is selected.

5. The method as claimed in claim 3, wherein said alcohol is selected from the group consisting of ethyl alcohol, benzyl alcohol, furfuryl alcohol, isopropyl alcohol, and butyl alcohol.

6. The method as claimed in claim 3, wherein said ketone is selected from the group consisting of dimethyl ketone, ethyl methyl ketone, and ethyl iso-propyl ketone.

7. The method as claimed in claim 3, wherein said aldehyde is selected from the group consisting of formaldehyde, acetaldehyde; and butyraldehyde.

8. The method as claimed in claim 3, wherein said carboxylic acid is selected from the group consisting of linoleic, lauric, formic, lactic, acrylic, and myristic acids.

9. The method as claimed in claim 3, wherein said alcohol is glycerine.

10. A method of forming an aluminum organoiodide comprising the steps of forming a reactive aluminum by permeating aluminum 99.99 percent pure by weight in the presence of an aqueous acid with a metal selected from the group consisting of mercury, indium, and gallium, and subsequently reacting the reactive aluminum with a combination of iodine and an organic compound selected from the group consisting of ethanolamine, butane, methane, and sorbitol.

* * * * *